(12) United States Patent
Gregoire

(10) Patent No.: US 6,758,240 B2
(45) Date of Patent: Jul. 6, 2004

(54) BIAS SPRING STRUCTURE FOR PRESSURE REGULATORS

(76) Inventor: Roger J. Gregoire, 460 Elm Valley Dr., Bulverde, TX (US) 78163

(*) Notice: Subject to any disclaimer, the term of this patent is extended or adjusted under 35 U.S.C. 154(b) by 0 days.

(21) Appl. No.: 10/065,754
(22) Filed: Nov. 15, 2002

(65) Prior Publication Data
US 2003/0121549 A1 Jul. 3, 2003

Related U.S. Application Data
(60) Provisional application No. 60/332,946, filed on Nov. 16, 2001.

(51) Int. Cl.[7] ............................................. G05D 16/06
(52) U.S. Cl. .................. 137/505.42; 137/505
(58) Field of Search .................. 137/505.37, 505.42, 137/505.45, 505; 92/103 M

(56) References Cited

U.S. PATENT DOCUMENTS

| | | | | |
|---|---|---|---|---|
| 2,704,548 A | * | 3/1955 | Ralston | 92/103 M |
| 4,635,683 A | * | 1/1987 | Nielsen | 137/625.65 |
| 4,719,940 A | * | 1/1988 | Beavers | 137/505.39 |
| 4,744,387 A | * | 5/1988 | Otteman | 137/505.41 |
| 4,915,127 A | * | 4/1990 | Werley | 137/505.42 |
| 5,501,247 A | * | 3/1996 | Miller | 137/505 |

* cited by examiner

Primary Examiner—Stephen M. Hepperle
(74) Attorney, Agent, or Firm—Novak Druce LLP

(57) ABSTRACT

A bias spring structure for pressure regulators for increasing flow capacity. The inventive device includes a specially shaped metal disc. The bias spring is a circular, thin, conically shaped, metal disc, with a center through hole, and having specifically controlled height and thickness values.

12 Claims, 4 Drawing Sheets

BIAS SPRING STRUCTURE FOR PRESSURE REGULATORS

CROSS REFERENCE TO RELATED APPLICATIONS

The present application claims priority to U.S. Provisional Application No. 60/332,946, filed Nov. 16, 2001.

BACKGROUND OF INVENTION

Technical Field. The present invention relates generally to pressure regulators. More specifically, it relates to a bias spring structure for pressure regulators for increasing flow capacity.

Background Information. Pressure regulators have been in use for years. Typically, pressure regulators are comprised of a flexible diaphragm clamped between a body section, and an actuator section. The body section typically has at least one inlet (high pressure) fluid port and at least one outlet (low pressure/regulated) fluid port. A poppet valve, seat, and bias spring are typically contained within the body section. However, the bias spring, particularly in 'tied-poppet' designs, can instead be located above the diaphragm in the actuator section.

The poppet valve and seat separate the high pressure from the low, regulated pressure. The bias spring biases the poppet valve against the seat, enabling a positive fluid shut-off. The actuator section applies a downward reference force upon the upper surface of the diaphragm. This is normally accomplished by an adjustably loaded compression spring or range spring. As the diaphragm deflects downward, the bias spring compresses and the poppet valve moves away from its valve seat, allowing fluid flow and pressure to build on the low-pressure side. The greater the deflection, the greater the poppet valve opening and the corresponding fluid flow. The fluid pressure on the low-pressure side acts on the underside of the diaphragm applying an upward force. The greater the pressure, the greater the upward force.

In conventional pressure regulators, the diaphragm's deflection/poppet opening is dictated by a balance-of-forces. The range spring applies a downward force. The balancing upward forces include the outlet pressure acting on the diaphragm's effective surface area, the bias spring, the diaphragm spring force, and the inlet pressure acting on the poppet/seat area. This can be described by the following equation—

Range Spring Force=Outlet Pressure Force+Bias Spring Force+ Diaphragm Spring Force+Inlet Pressure Force Flow capacity is defined as the usable flow range of a pressure regulator without significant loss in outlet pressure. A problem with conventional pressure regulators is the bias springs have a positive spring-rate that contributes to the reduction of flow capacity, i.e., the higher the bias spring spring-rate, the greater the reduction in flow capacity. Bias spring deflection multiplied by its spring-rate equals the bias spring force. As the diaphragm (and poppet valve) deflects downward, not only does flow increase, but the bias spring also increases in force, with the amount of change dependent upon its spring-rate. From the above 'balance-of-forces' equation, it is seen that an increase in bias spring force contributes to a decrease in outlet pressure, resulting in a reduction in flow capacity.

Prior apparatus and methods for reducing spring-rates within a pressure regulator are known, such as that found in U.S. Pat. Nos. 1,103,020 and 3,689,055. Although these devices help to reduce spring-rates, they all require additional components, added complexity, and increased costs. While they may be suitable for the particular purpose that they address, they are not as suitable for increasing flow capacity.

Accordingly, there is a need for a bias spring structure that departs from the conventional concepts and designs of the prior art, and in so doing provides an apparatus primarily developed for the purpose of increasing flow capacity.

SUMMARY OF INVENTION

In view of the foregoing, the present invention provides a new bias spring structure for pressure regulator construction that can be utilized for increasing flow capacity.

The present invention provides a new bias spring structure for pressure regulators that has many of the advantages of the pressure regulators mentioned heretofore, as well as additional novel features that result in a new bias spring structure for pressure regulators. Accordingly, the present invention includes a specially shaped metal disc or bias spring. The bias spring is a circular, thin, conically shaped, metal disc with a center through hole, having specifically controlled height and thickness values.

An object of the present invention is to provide a bias spring structure for pressure regulators whereby flow capacity is increased.

Another object is to provide a bias spring structure for pressure regulators that produces a non-positive spring rate throughout its usable deflection.

Another object is to provide a bias spring structure for pressure regulators that increases flow capacity without requiring additional components.

Other objects and advantages of the present invention will become obvious by a review of the detailed description below with reference to the attached figures. It is intended that these objects and advantages be within the scope of the present invention.

To accomplish the above and related objects, this invention may be embodied in the form illustrated in the accompanying drawings. However, it should be understood that the drawings are illustrative only, and that changes may be made in the specific construction illustrated.

BRIEF DESCRIPTION OF DRAWINGS

Various other objects, features and attendant advantages of the present invention will become fully appreciated when considered in conjunction with the accompanying drawings, in which like reference characters designate the same or similar parts throughout the several views, and wherein.

DETAILED DESCRIPTION

Figure 1:
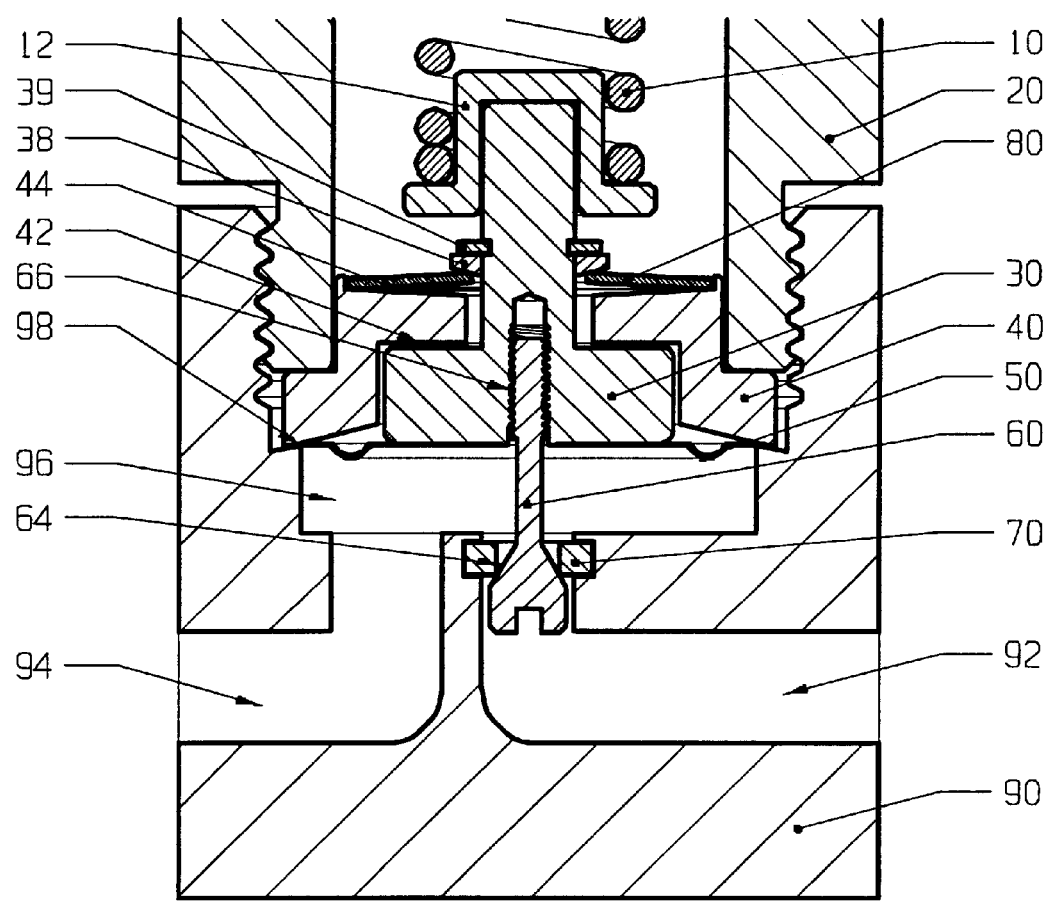
FIG. 1 is a cross sectional partial view of a pressure regulator incorporating the present invention.

Turning now to the drawings, in which similar reference characters denote similar elements throughout the several views, there is illustrated a bias spring structure for pressure regulators having a specially shaped metal disc. The bias spring is a circular, thin, conically shaped, metal disc with a center through hole, having specifically controlled height and thickness values.

Figure 6:
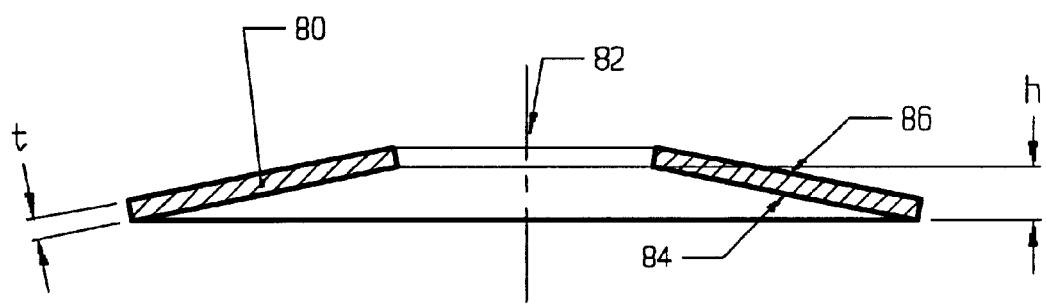
FIG. 6 is a cross sectional view of the present invention.

Referring to FIG. 6, a bias spring 80 is shown that is conically shaped with a height h and a thickness t. The through hole 82 is centrally located. The surface 86 is the exterior/upper surface. The surface 84 is the interior/lower surface. The height h is not the overall height but is the interior height as shown in FIG. 6. The values of h and t are specifically determined and held relative to each other so that the bias spring has a controlled negative spring-rate. It is known with disc and Belleville type springs that varying the h/t ratio controls the shape of the spring-rate curve.

Figure 2:
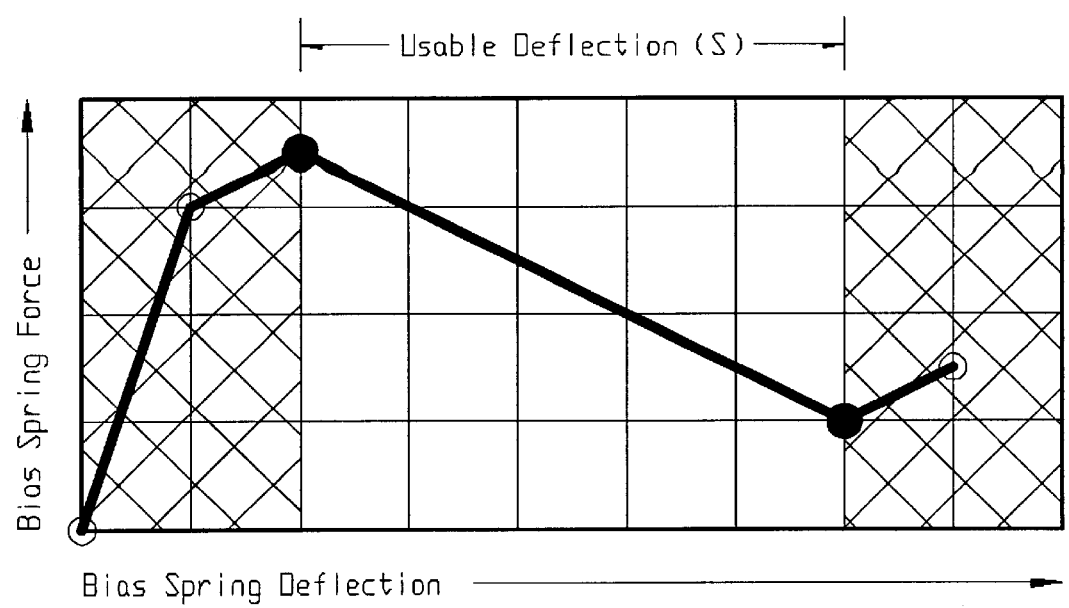
FIG. 2 is a graphical representation of the spring rate (force/deflection) of the present invention.

FIG. 2 shows by example a spring rate curve of the new bias spring structure having an h/t ratio of approximately 2.5. The downward slope represents a negative spring rate. When installed, the bias spring is preloaded so that its starting deflection begins at a non-positive point in the curve, i.e., when the poppet valve is in the full up and sealing position. A tapered surface 44 of a clamp plate 40 provides a mechanical stop, ending the deflection at a non-positive point in the curve.

Too high or too low an h/t ratio is undesirable. For example, an h/t value larger than 2.8 will create an undesirable bi-stable, snap through or oil-canning action. This implies that the bias spring will snap through and hold in the inverted position until forced back. An h/t value of less than 2.0 will not generate any significant amount of negative spring-rate; virtually all of the spring-rate will be in the positive direction.

Figure 5:
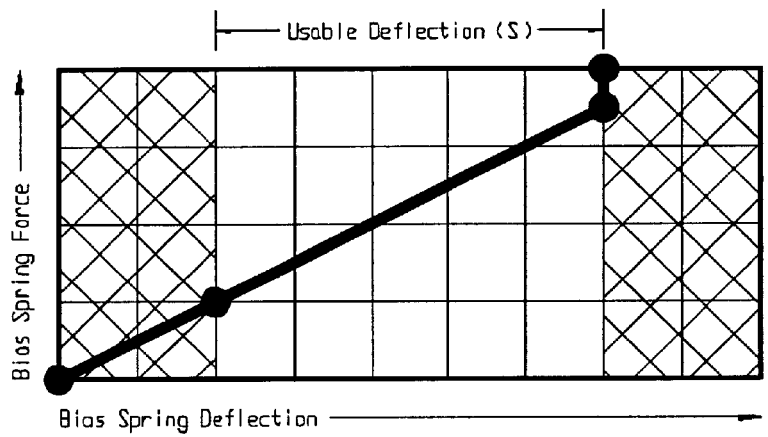
FIG. 5 is a graphical representation of the spring rate (force/deflection) of the prior art bias spring structure.

Prior art bias springs, typically helical compression springs, have positive or non-negative spring-rates through out the usable deflection, as illustrated in FIG. 5. Ideally, when designing a negative spring-rate bias spring, one must also consider the spring force value needed to sufficiently enable fluid shut-off sealing of the poppet 60 against the seat 70, as well as consider material stress levels so as to maximize cycle life. Varying material type, inside diameter, outside diameter, thickness, etc., has an effect on spring force and cycle life. So long as the h/t ratio is maintained approximately within the range of 2.0 to 2.8, a desirable non-positive spring-rate will occur. Selecting the non-positive portion of the spring-rate curve as the poppet opening deflection range improves pressure regulator flow capacity. In one embodiment, the conical shape could be replaced with a radiused shape, so as to approximate the conical shape.

As shown in FIG. 1, the actuator section 20 is connected to the regulator body section 90 (here, by threads), loading a clamp plate 40 against the diaphragm 50. This presses the diaphragm 50 into sealing engagement with an edge 98 of the regulator body 90. A diaphragm plate 30 is held trapped between the diaphragm 50 and an interior shoulder 42 of the clamp plate 40. The clamp plate surface 44 is preferably but not necessarily tapered downward, extending the deflection range of the bias spring 80. The range spring 10 applies a downward force upon a spring cap 12, diaphragm plate 30, bias spring 80, diaphragm 50, and poppet valve 60. The lower outer diameter of the bias spring 80 rests upon the outer diameter of the clamp plate surface 44. A retainer 39 is attached to the diaphragm plate 30. A washer 38 is trapped between the retainer 39 and an upper inner diameter of the bias spring 80. The washer 38 can be tapered to insure that bias spring loading point stays on the innermost edge throughout deflection range. In lieu of the washer 38 and retainer 39, any mechanical linkage that links the poppet valve 60 deflection with the bias spring 80 deflection would be acceptable.

In a conventional tied poppet design, the poppet valve 60 is attached to the diaphragm plate 30 via threads 66, though any means of attaching poppet valve can be utilized. The bias spring 80 urges the poppet valve 60 into sealing engagement against the seat 70. The diaphragm plate 30, when deflected downward by the range spring 10, moves the poppet valve tapered surface 64 away from seat 70.

When poppet valve 60 is in its full up position, the poppet valve surface 64 sealingly engages the seat 70. In the full up and valve sealing position, the bias spring 80 is held partially deflected at the beginning of its usable deflection range, shown in FIG. 2 as the uppermost point.

Figure 3:
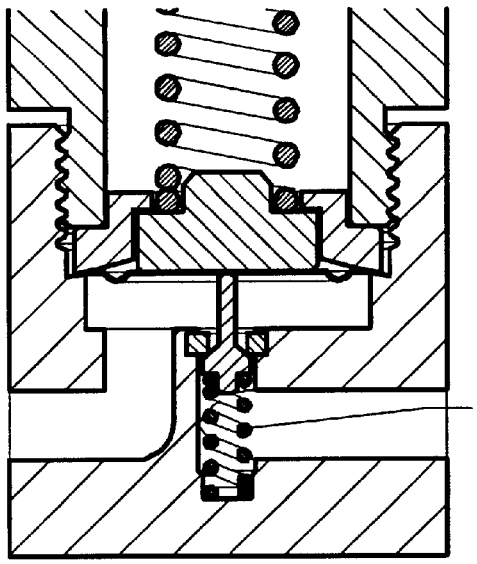
FIG. 3 is a cross sectional partial view of a free poppet pressure regulator incorporating the prior art.
Figure 4:
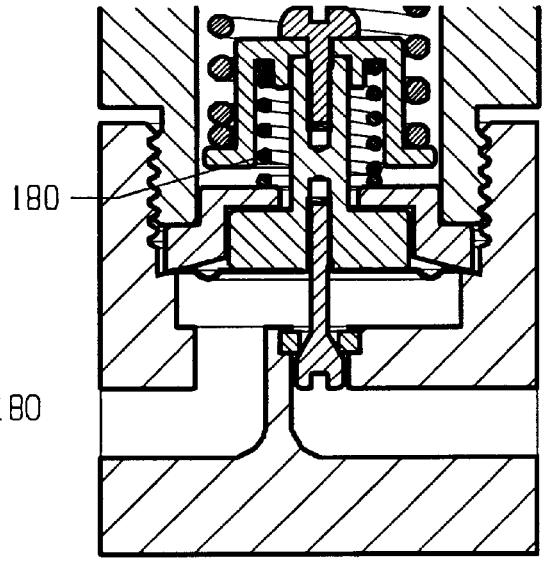
FIG. 4 is a cross sectional partial view of a tied poppet pressure regulator incorporating the prior art.

FIGS. 3 and 4 show a prior art bias spring 180 structure. FIG. 3 shows a free-poppet design where the bias spring 180 is located below the unattached poppet valve. FIG. 4 shows a tied-poppet design where the bias spring 180 is located above the attached poppet. In the free-poppet regulator design of FIG. 3, the new invented bias spring 80 would replace the bias spring 180 below the poppet valve. Modifications to the body 90 and poppet valve 60 would be necessary to accommodate the bias spring of the present invention to the free-poppet pressure regulator.

The range spring 10 is manually compressed and adjusted to set the desired outlet pressure at the outlet port 94. The range spring applies a downward direction force upon the spring cap 12, diaphragm plate 30, upper inside diameter of bias spring 80, diaphragm 50, and poppet valve 60. As these components move downward in response to force changes caused by increased flow demand, the poppet valve 60 moves away from seat 70 allowing fluid to flow from the inlet port 92, around the poppet valve 60, through the seat 70, into the outlet cavity 96, and out through the outlet port 94. The outlet pressure within the outlet cavity 96 places an upward force against the diaphragm 50, creating an upward force. The inlet pressure acting on the bottom side of the poppet valve 60, the area roughly equivalent to the seat area, imposes an upward force. The bias spring 80 also produces an upward force. The outlet pressure will vary accordingly so as to maintain a balance-of-forces, the balance of forces being—

Range spring force=Outlet Pressure (acting on diaphragm effective area) force+Bias Spring Force+Inlet Pressure (acting on poppet seat area) force+diaphragm spring force With downward deflection in response to increased flow demand, the Bias Spring, Diaphragm Spring, and Range Spring forces change with the deflection, dependent on their individual spring rates. The net spring rate (determined by the summation of the individual spring rates) multiplied by the deflection amount equals the total force change that the outlet pressure must change so as to compensate for and maintain a balance-of-forces. The range 10 and diaphragm 50 springs both have positive spring-rate values. The presently invented bias spring has a negative spring rate value, and when summed together with the range and diaphragm spring-rates give a lower net spring-rate value than was the case with the prior-art positive spring-rate bias spring. This lower net spring rate value yields a lower force change per given deflection, yielding a lesser decrease in outlet pressure as flow increases, thereby improving flow capacity.

The manner of usage and operation of the present invention should be apparent from the above description.

Accordingly, no further discussion relating to the manner of usage and operation will be provided.

It should be realized that the optimum dimensional relationships for the parts of the invention, including variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

It is to be understood that the invention is not limited in its application to the details of construction and to the arrangements of the components set forth above or illustrated in the drawings. The invention is capable of other embodiments and of being practiced and carried out in various ways. Also, it is to be understood that the phraseology and terminology employed herein are for the purpose of the description and should not be regarded as limiting.

What is claimed is:

1. A pressure regulator comprising:
    an actuator section for engaging a diaphragm with a regulator body section, the actuator section able to be connected with the regulator body section;
    a bias spring positioned between the actuator section and the regulator body section; and
    a poppet valve for controlling flow through the pressure regulator; and
    the bias spring having a controlled negative bias spring raw throughout a useable deflection thereof and which is controlled by varying a height to thickness ratio of the bias spring.

2. The pressure regulator according to claim 1, the bias spring further comprising a conically shaped metal disc having a through hole.

3. The pressure regulator according to claim 1 wherein the bias spring is preloaded so that a starting deflection of the bias spring begins at a non-positive point in a spring rate curve.

4. The pressure regulator according to claim 1 wherein the bias spring is preloaded so that a starting deflection of the bias spring begins when the poppet valve is in a full up and sealing position.

5. The pressure regulator according to claim 1 wherein the height to thickness ratio is within the range of about 2.0 to 2.8.

6. The pressure regulator according to claim 3 wherein, by beginning at a non-positive point in the spring rate curve, pressure regulator flow capacity is improved.

7. The pressure regulator according to claim 1, further comprising a clamp plate for sealingly engaging the diaphragm with the regulator body section, a surface of the clamp plate being tapered so as to extend a deflection range of the bias spring.

8. The pressure regulator according to claim 1, further comprising:
    a diaphragm plate able to engage with a range spring in the actuator body section,
    a retainer able to be attached to the diaphragm plate, and
    a washer positioned between the retainer and the upper portion of the bias spring,
    wherein the washer is tapered so as to substantially maintain a bias spring loading point at an innermost edge throughout a deflection range of the bias spring.

9. The pressure regulator according to claim 1, further comprising:
    a diaphragm plate able to engage with a range spring in the actuator body section,
    a retainer able to be attached to the diaphragm plate, and
    a mechanical linkage for linking a deflection of the poppet valve with a deflection of the bias spring.

10. The pressure regulator according to claim 1, further comprising a range spring, wherein the range spring and a diaphragm spring have positive spring-rate values.

11. A pressure regulator comprising:
    an actuator section for engaging a diaphragm with a regulator body section, the actuator section able to be connected with the regulator body section;
    a poppet valve for controlling flow through the pressure regulator; and
    a bias spring positioned between the actuator section and the regulator body section, the bias spring being configured as a conically shaped metal disc and having a controlled negative bias spring rate throughout a useable deflection thereof.

12. A pressure regulator comprising:
    an actuator section for engaging a diaphragm with a regulator body section, the actuator section able to be connected with the regulator body section;
    a poppet valve for controlling flow through the pressure regulator;
    a bias spring positioned between the actuator section and the regulator body section, the bias spring having a controlled negative bias spring rate throughout a useable deflection thereof; and
    a range spring and a diaphragm spring, wherein the range spring and diaphragm spring have positive spring-rate values.

* * * * *